(12) United States Patent
Yang et al.

(10) Patent No.: US 9,190,179 B2
(45) Date of Patent: Nov. 17, 2015

(54) METHOD OF CONTROLLING SOLUBILITY OF ADDITIVES AT AND NEAR GRAIN BOUNDARIES, AND METHOD OF MANUFACTURING SINTERED NUCLEAR FUEL PELLET HAVING LARGE GRAIN SIZE USING THE SAME

(75) Inventors: Jae-Ho Yang, Daejeon (KR); Keon-Sik Kim, Daejeon (KR); Kun-Woo Song, Daejeon (KR); Jong-Hun Kim, Daejeon (KR); Young-Woo Rhee, Daejeon (KR); Dong-Joo Kim, Daejeon (KR); Chill-Sun Ryu, Daejeon (KR)

(73) Assignees: Korea Atomic Energy Research Institute, Daejeon (KR); Korea Hydro & Nuclear Power Co. Ltd., Seoul (KR)

( * ) Notice: Subject to any disclaimer, the term of this patent is extended or adjusted under 35 U.S.C. 154(b) by 1326 days.

(21) Appl. No.: 13/275,784

(22) Filed: Oct. 18, 2011

(65) Prior Publication Data

US 2012/0098149 A1 Apr. 26, 2012

(30) Foreign Application Priority Data

Oct. 20, 2010 (KR) ........................ 10-2010-0102397

(51) Int. Cl.
*G21C 21/00* (2006.01)
*G21C 21/02* (2006.01)
*G21C 3/62* (2006.01)

(52) U.S. Cl.
CPC *G21C 21/02* (2013.01); *G21C 3/62* (2013.01); *G21C 3/623* (2013.01); *Y02E 30/38* (2013.01)

(58) Field of Classification Search
CPC ................................. G21C 3/623; G21C 21/03
See application file for complete search history.

(56) References Cited

U.S. PATENT DOCUMENTS

| 4,430,276 A | 2/1984 | Radford et al. ................ 264/0.5 |
| 4,869,866 A | 9/1989 | Lay et al. ...................... 376/421 |

(Continued)

FOREIGN PATENT DOCUMENTS

| JP | 64-029796 | 1/1989 |
| JP | S64-091094 A | 4/1989 |

(Continued)

OTHER PUBLICATIONS

Japan Office Action, issued Oct. 1, 2013 in the corresponding Japanese patent application No. 2011-229977.

(Continued)

*Primary Examiner* — Erin Snelting
(74) *Attorney, Agent, or Firm* — Roberts & Roberts, LLP

(57) ABSTRACT

Provided are a method of controlling the compositional gradient and solubility of doped-additives at grain boundaries during sintering of a uranium-based oxide green pellet including the additives, and a method of manufacturing a sintered nuclear fuel pellet having a large grain size using the same. The grain boundary solubility of the doped-additives is maintained at a certain level by stepwise varying of an oxygen partial pressure during isothermal sintering of a uranium-based oxide green pellet including the additives. The method of manufacturing a sintered nuclear fuel pellet having a large grain size includes preparing additive mixed uranium oxide powder, forming an additive mixed uranium oxide green pellet using the mixed powder, heating the green pellet to a sintering temperature in a gas atmosphere having a low oxygen partial pressure, and sintering while a sintering gas atmosphere is changed to stepwise increase an oxygen partial pressure at the isothermal sintering temperature.

8 Claims, 5 Drawing Sheets

(56) References Cited

U.S. PATENT DOCUMENTS

| | | | |
|---|---|---|---|
| 6,221,286 B1 | 4/2001 | Dehaudt et al. | 264/0.5 |
| 6,235,223 B1 * | 5/2001 | Doerr et al. | 264/0.5 |
| 6,669,874 B1 * | 12/2003 | Abry et al. | 252/636 |
| 6,783,706 B1 | 8/2004 | Vandergheynst et al. | |
| 6,878,313 B2 | 4/2005 | Kobayashi et al. | 264/0.5 |
| 2004/0103752 A1 | 6/2004 | Song et al. | |
| 2010/0091933 A1 | 4/2010 | Song et al. | |

FOREIGN PATENT DOCUMENTS

| | | |
|---|---|---|
| JP | H02-055991 A | 2/1990 |
| JP | H04-070594 A | 3/1992 |
| JP | H04-127085 A | 4/1992 |
| JP | H06-281774 A | 10/1994 |
| JP | 9-049892 | 2/1997 |
| JP | 2002-536628 A | 10/2002 |
| JP | 2004-309453 A | 11/2004 |
| KR | 2004-0029667 | 4/2004 |
| KR | 10-0832567 | 5/2008 |
| KR | 10-0964953 | 6/2010 |

OTHER PUBLICATIONS

Killeen, et al. "Fission Gas Release and Swelling in UO sub 2 Doped With Cr sub 2 O sub 3." Journal of Nuclear Materials, vol. 88 (1980), p. 177-184.

Kashibe et al. "Effect of Additives (Cr sub 2 O sub 3, Al sub 2 O sub 3, SiO sub 2, MgO of Diffusional Release of sup 1 sup 3 sup 3 Xe From UO sub 2 Fuels." Journal of Nuclear Materials, vol. 254 (1998), p. 234-242.

Bourgeois et al. "Factors Governing Microstructure Development of Cr sub 2 O sub 3—Doped UO sub 2 During Sintering." Journal of Nuclear Materials, vol. 297 (2001), p. 313-326.

A. Leenaers et al. "On the Solubility of Chromium Sesquioxide in Uranium Dioxide Fuel." Journal of Nuclear Materials, vol. 317 (2003), p. 62-68.

Bourgeois L., et al. "Effect of Additives on Enhanced Sintering and Grain Growth in Uranium Dioxide." Jun. 1992. 144P.

* cited by examiner

B-1
 B-2
 B-3
 B-4

METHOD OF CONTROLLING SOLUBILITY OF ADDITIVES AT AND NEAR GRAIN BOUNDARIES, AND METHOD OF MANUFACTURING SINTERED NUCLEAR FUEL PELLET HAVING LARGE GRAIN SIZE USING THE SAME

TECHNICAL FIELD

The present invention relates to a method of controlling grain boundary solubility of additives and a method of manufacturing a sintered nuclear fuel pellet using the same, and more particularly, to a method of controlling grain boundary solubility, wherein the compositional gradient of additives across the grain boundaries is maintained at a certain level by stepwise varying of an oxygen partial pressure during sintering of a uranium-based oxide green pellet mixed with one or more additives of a chromium (Cr)-compound, an aluminum (Al)-compound, and a yttrium (Y)-compound, and a method of manufacturing a sintered pellet having a large grain size using the same.

BACKGROUND ART

Nuclear power plant uses heat generated by the nuclear fission of uranium. The nuclear fuel material currently in widest use is uranium oxide pellets. In a typical production process of the uranium oxide pellets, a lubricant is added to and mixed with a starting material of uranium oxide powder, and then pre-molded under a predetermined pressure, e.g., about 1 ton/cm$^2$ to produce a slug. The slug is pulverized to obtain granules. Subsequently the lubricant is added to and mixed with the granules obtained and then compression-molded to form a compact, i.e., green pellets having a theoretical density (TD) of about 50%. The compact is sintered in a hydrogen-containing gas atmosphere to produce uranium oxide pellets. The uranium oxide pellets obtained as described above have a TD of about 95.5% and a grain size of 6 to 10 µm. Crystal grains of the nuclear fuel pellets are of an equiaxed polyhedron. Recently, nuclear fuel for high burn-up and long fuel cycle have been developed in order to enhance the economic operation of nuclear power plant and minimize the amount of spent nuclear fuel. A sintered nuclear fuel pellet having a large grain size can improve the integrity of a nuclear fuel rod under high burn-up conditions by preventing the external release of fission products having a gaseous phase or corrosiveness from the sintered fuel pellets. Also, deformation characteristics at high temperatures are improved when grain size increases. As a result, the safety of the nuclear fuel rod can be improved by effectively decreasing stress induced on a cladding by the sintered fuel pellets during an operation. For this reason, research has been conducted into manufacturing sintered uranium-based oxide pellets having a large grain size as sintered pellets used in a nuclear fuel rod for high burn-up or ultra high burn-up. Since grain growth is achieved by means of the transfer of materials through grain boundaries, it is important to increase a transfer rate of materials through grain boundaries during sintering in order to manufacture a sintered pellet having a large grain size. Methods of increasing a sintering temperature or using additive elements have been disclosed in order to increase a grain size during the manufacturing of a sintered nuclear fuel pellet. Methods of dissolving additive elements and forming a liquid phase having a fast diffusion rate at grain boundaries are disclosed for the using of the additive elements.

The method of dissolving additive elements uses a phenomenon in which defects are formed when additive elements are dissolved in a uranium-based oxide and the transfer of materials is facilitated, such that a grain growth rate is increased. A method of sintering at low temperatures by dissolving surplus oxygen in UO$_2$ is disclosed in U.S. Pat. No. 6,878,313 B2. In this patent, a process for decreasing a sintering temperature by increasing an oxygen partial pressure of a sintering gas to dissolve oxygen ions in UO$_2$ lattices to form uranium (U) cation vacancies, and increasing a material transfer rate through the formed U cation vacancies is suggested. In addition, aluminum (Al), chromium (Cr), titanium (Ti), niobium (Nb), magnesium (Mg), vanadium (V), phosphorous (P), or silicon (Si) are known as additive elements. The additive elements are usually added in a range of a few ppm to a few tens of thousands of ppm, based on a weight ratio with respect to uranium cations in a sintered pellet, and the amounts of additive elements may differ according to the type of additive element. In the method of increasing a grain growth rate by forming defects through the dissolution of additives, an amount of additives has to be increased in order to obtain a defect concentration above a certain level. Also, defects in UO$_2$ lattices formed by dissolution have a limitation of contributing to increase release rates of fission gases generated during irradiation in a reactor. That is, although a grain size is increased to suppress fission gas release, a suppressing effect on the fission gas release is offset due to an increase in a diffusion rate of fission product in the UO$_2$ lattices. According to the results of studies by Killeen et al. [Journal of Nuclear Materials, 88 (1980), p. 177-184] and Kashibe et al. [Journal of Nuclear Materials, 254 (1998), p. 234-242], it is reported that Cr ions were dissolved in a UO$_2$ pellet to exhibit a grain growth effect, but a suppressing effect on fission gas release was low due to an increase in a diffusion rate of a fission gas caused by defect formation in UO$_2$ lattices. To overcome the foregoing limitation, methods for removing surplus oxygen by heat treating in a reducing atmosphere at a temperature lower than a sintering temperature or minimizing lattice defects by precipitating dissolved metal cations in a metal form are disclosed in U.S. Pat. Nos. 6,878,313 B2 and 6,221,286 B1, respectively.

Technologies related to the methods of increasing a grain size by allowing additive elements to form a liquid phase at grain boundaries near a sintering temperature are reported. In U.S. Pat. No. 4,869,866, a technology for manufacturing sintered UO$_2$ having an average grain size of 37 µm by sintering at 1640° C. for 7 hours after adding 0.5 wt % of an alumino-silicate additive is disclosed. According to this patent, it is reported that the alumino-silicate additive forms a liquid phase at grain boundaries near a sintering temperature and grain growth occurs by considerably accelerating material transfer through the liquid phase. Bourgeois et al. [Journal of Nuclear Materials, 297 (2001), p. 313-326] report that when an oxygen partial pressure of a sintering gas is controlled to a specific value during the manufacturing of Cr-added sintered UO$_2$, a Cr-compound additive forms a liquid phase during sintering to greatly increase the grain size of the sintered UO$_2$. U.S. Pat. No. 6,221,286 B1 suggests a process, in which a Cr$_2$O$_3$-added UO$_2$ green pellet is sintered in an oxygen partial pressure interval where a liquid phase is formed, and then, dissolved Cr is precipitated into Cr metal particles by annealing at low temperatures and low oxygen partial pressures. In the case of a process using a liquid phase, a grain size is determined by an amount of a liquid phase formed at grain boundaries, and since a portion of additives is dissolved before reaching a liquid phase formation temperature or a portion of the liquid phase is dissolved in grain interiors during liquid phase sintering, a large amount of additives may be necessary to obtain grains of a desired size.

For example, a detailed method of manufacturing a Cr-added sintered $UO_2$ having a large grain size disclosed in U.S. Pat. No. 6,221,286 B1 is as follows. A sintered pellet is manufactured by sintering a $Cr_2O_3$-added uranium oxide green pellet at 1700° C. for 4 hours in a wet hydrogen gas atmosphere having a moisture/hydrogen gas ratio of 1.7%, and then, a sintered nuclear fuel pellet with precipitated Cr is manufactured by annealing the sintered pellet at 1300° C. for 5 hours in a dry hydrogen gas atmosphere having a moisture/hydrogen gas ratio of 0.05% or less. In the foregoing method, the added $Cr_2O_3$ maintains a $Cr_2O_3$ phase while the temperature of the green pellet is increased to near 1680° C., and dissolution occurs in a portion of the added $Cr_2O_3$. A portion of the $Cr_2O_3$, remaining without dissolution, contributes to grain growth by forming a liquid phase at 1680° C. or more. Thereafter, dissolved Cr is precipitated into Cr metal particles in a low temperature annealing process. Since a large amount of initially added $Cr_2O_3$ is dissolved before the forming of a liquid phase and only a portion contributes to grain growth, a large additive amount more than 1000 ppm is necessary.

When a grain size of a uranium-based oxide is increased by using additives, it is necessary to minimize an amount of the additives for obtaining the same grain size if possible. The reason is that the additive elements increase diffusion rates of fission products by dissolving $UO_2$ lattice as well as reducing neutron economic by lowering an amount of a U charge or absorbing neutrons. Therefore, developments of new technologies capable of significantly increasing a grain size as well as minimizing an amount of additives are necessary.

A method, which improves a grain growth effect by maximizing an amount of a liquid phase existing at a sintering temperature through maximally suppressing dissolution of additives while the temperature of a green pellet is increased to the sintering temperature, is disclosed in Korean Patent No. 10-0964953. This patent is characterized in that an added Cr-compound is reduced to Cr at 1500° C. or less and a Cr phase is maintained. Thereafter, a process of sintering at 1650-1780° C. in a gas atmosphere having an oxygen potential of forming a Cr liquid phase is included. A sintered pellet manufactured by the foregoing process may have a larger grain size because an amount of a liquid phase formed during sintering based on the same addition amount is greater in comparison to a sintered pellet manufactured by the process suggested in U.S. Pat. No. 6,221,286 B1. However, the process suggested in Korean Patent No. 10-0964953 has a limitation in that the additive liquid phase formed is rapidly dissolved into $UO_2$ lattices because oxygen partial pressure rapidly increases at a high sintering temperature. According to the results of a study by A. Leenaers et al. [Journal of Nuclear Materials, 317 (2003), p. 62-68], it is reported that the solubility of Cr ions in $UO_2$ lattices rapidly increases when temperature and oxygen partial pressure increase at 1550° C. or more. Therefore, the process suggested in Korean Patent No. 10-0964953 has limitations in that duration time of liquid phases formed at grain boundaries is too short to completely contribute to grain growth, and more than a certain amount of additives is necessary.

DISCLOSURE

Technical Problem

An aspect of the present invention provides a method of controlling solubility of additives dissolved at and near grain boundaries during sintering of a uranium-based oxide green pellet including additives with solubility in a uranium-based oxide varied according to an oxygen partial pressure of a sintering gas, and a method of manufacturing a sintered nuclear fuel pellet having a large grain size using the same.

Technical Solution

An aspect of the present invention provides a method of controlling a solubility of additive elements at and near grain boundaries, wherein the solubility of the additives at and near the grain boundaries is maintained at a certain level by stepwise varying of an oxygen partial pressure during isothermal sintering of a uranium-based oxide green pellet including an additive powder of elements.

The oxygen partial pressure may be stepwisely increased during the isothermal sintering.

According to another aspect of the present invention, there is provided a method of manufacturing a sintered nuclear fuel pellet having a large grain size including: mixing an additive powder and a uranium oxide powder to prepare an additive mixed uranium oxide powder; forming an additive mixed uranium oxide green pellet by using the mixed powder; heating the green pellet to an isothermal sintering temperature in an atmosphere control gas having an oxygen partial pressure corresponding to a minimum oxygen partial pressure of isothermal sintering or less; and changing a sintering gas atmosphere to perform the isothermal sintering such that an oxygen partial pressure is stepwise increased at the isothermal sintering temperature.

An amount of additive cations with respect to about 1 g of uranium-based cations in the uranium oxide green pellet may be about 10-2000 μg.

The additive powder may be a powder mixed with at least one or more of a chromium (Cr)-compound, an aluminum (Al)-compound, and a yttrium (Y)-compound.

Also, the Cr-compound, the Al-compound, and the Y-compound may be at least one or more selected from the group consisting of oxides, nitrates, stearates, chlorides, and hydroxides.

In the preparing of the additive mixed uranium oxide powder, a $UO_2$-based powder may be a $UO_2$ powder or a powder mixed with the $UO_2$ powder and one or more of a $PuO_2$ powder, a $Gd_2O_3$ powder, and a $ThO_2$ powder.

The atmosphere control gas may be a hydrogen gas or a mixed gas of a hydrogen gas and at least one or more gases selected from the group consisting of carbon dioxide, water vapor, and inert gases.

Advantageous Effects

When a method of manufacturing a sintered pellet according to the present invention is used, a decrease in a driving force for grain growth during sintering is minimized so that a sintered pellet having a larger grain size than a typical sintered pellet may be manufactured by using the same amount of additives. Also, release of fission products during irradiation in a reactor is prevented and deformation characteristics at high temperatures are improved by manufacturing a sintered pellet having a large grain size. Therefore, there is an effect of improving the integrity and safety of a nuclear fuel rod for high burn-up.

DESCRIPTION OF DRAWINGS

The above and other aspects, features and other advantages of the present invention will be more clearly understood from the following detailed description taken in conjunction with the accompanying drawings, in which:

FIGS. 3A through 3C are micrographs of grains according to Examples and Comparative Examples, in which FIG. 3A is a micrograph of grains in Example 1, (B-1), (B-2), (B-3), and (B-4) of FIG. 3B are micrographs of grains in Comparative Examples 1, 2, 3, and 4, respectively, and FIG. 3C is a micrograph of grains in Example 2.

BEST MODE

Hereinafter, the present invention will be described in detail.

Among sesquioxides containing trivalent cations, for example, $Al_2O_3$, $Cr_2O_3$, $Y_2O_3$, and $Al_2O_3$ have a similar tendency to one another, in which solubility in $UO_2$ lattices increases as an oxygen partial pressure increases. Also, grain boundary solubility of the sesquioxides increases as an oxygen partial pressure increases.

Since a grain boundary has more defects than a lattice, the grain boundary has a higher solubility limit than the lattice in a grain. Also, since a driving force of grain growth may become high when the concentration differences of additives between at a grain boundary and a lattice are large, the large difference between at a grain boundary and a lattice may be advantageous for grain growth. Therefore, when grain boundary solubility of additives at grain boundary to in grain is denoted to C and the grain boundary solubility of additives is denoted as B, a growth rate of grains becomes large in a condition where B and C are large at the same time.

Figure 1:
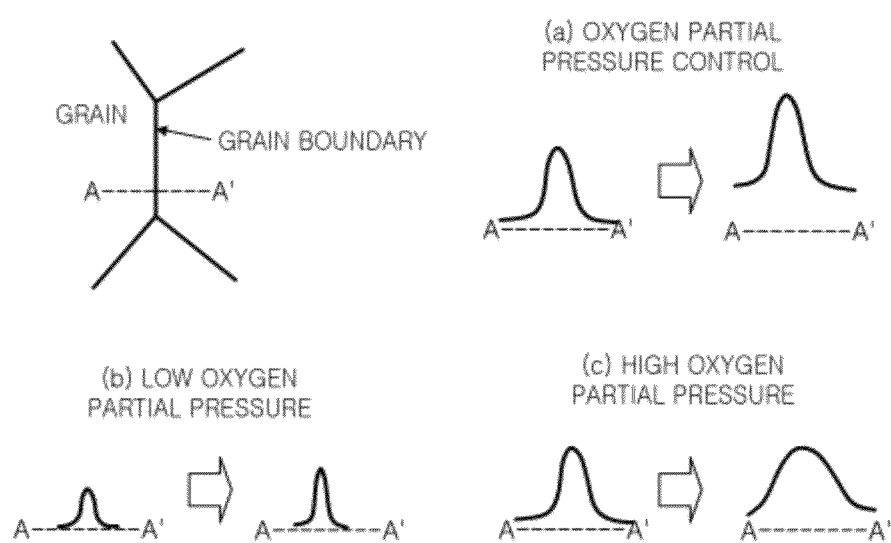
FIG. 1 is a schematic diagram illustrating a change of an additive concentration near a grain boundary according to a change of an oxygen partial pressure of a sintering gas during isothermal sintering of uranium-based oxide including sesquioxide additives having solubility increased with increasing oxygen partial pressure.

FIG. 1 is a schematic diagram illustrating a change of an additive concentration across a grain boundary in terms of an oxygen partial pressure of a sintering gas during isothermal sintering of a uranium-based oxide green pellet, which contains additives including sesquioxides, such as $Cr_2O_3$ and $Y_2O_3$ having solubility increased with increasing oxygen partial pressure.

As shown in FIG. 1(*b*), when sintered at a low oxygen partial pressure, solubility of the additives is very low at a grain boundary as well as in an interior of a lattice. Since B is low, although C may be maintained at a certain level, a very small amount of the additives may participate in grain growth. Therefore, grain growth may be difficult in this case.

As shown in FIG. 1(*c*), when an oxygen partial pressure of a sintering gas is increased, grain growth may be promoted to a certain extent because B becomes high. However, since C also becomes gradually low when the additives concentration at grain boundary soon reaches a solubility limit and lattice diffusion of additives occurs, a driving force for grain growth will be gradually decreased.

This may be also confirmed in Korean Patent No. 10-0964953, in which grain growth is actively performed at an oxygen partial pressure of forming a liquid phase disclosed in a Cr-containing $UO_2$ sintering process, because B and C are simultaneously high at the time of the forming of a liquid phase during sintering of Cr-containing $UO_2$. However, the additives in liquid phase thereafter diffuse fast into the interiors of grains to thereby end grain growth.

According to the present invention, it may be understood that B and C may always be maintained above particular values during sintering in order to maximize grain growth during sintering of a uranium-based oxide green pellet containing additives including sesquioxides such as $Cr_2O_3$ and $Y_2O_3$ having solubility increased with increasing oxygen partial pressure.

The maintaining of B and C above the particular values may be achieved through a method of a stepwise increase of an oxygen partial pressure of a sintering gas during isothermal sintering. That is, grain boundary solubility increases as an oxygen partial pressure is gradually increased, and thus, an amount of additives, which is larger than an amount of additives diffused from grain boundaries to the interiors of grains, will be continuously supplied to the grain boundaries.

Therefore, as shown in FIG. 1(*a*), since B and C are maintained at high values and a decrease in a driving force of grain growth during sintering may be minimized, a sintered pellet with a grain size larger than a typical sintered pellet may be manufactured when the same amount of additives is used.

In summary, in the sintering of a uranium-based oxide green pellet including additive powder of elements, it is possible to maintain concentration and compositional gradient of the additive elements at and near grain boundaries at a certain level by the stepwise varying of an oxygen partial pressure during isothermal sintering. More particularly, it is possible to maintain a solubility gradient capable of manufacturing a sintered nuclear fuel pellet having a large grain size if an oxygen partial pressure during the isothermal sintering is always increased.

Also, a sintered nuclear fuel pellet having a large grain size may be manufactured when the foregoing solubility controlling method is used, thereby enabling an improvement in the integrity of a nuclear fuel rod for high burn-up.

Hereinafter, a method of manufacturing a sintered nuclear fuel pellet according to the present invention is described.

Additive mixed uranium oxide powder is prepared, and then, uranium oxide green pellets with mixed additives are formed by using the foregoing mixed powder. Subsequently, the green pellets are heated to a sintering temperature in a gas atmosphere with a low oxygen partial pressure, and then, sintered nuclear fuel pellets having a large grain size are manufactured by sintering the pellets while varying the sintering gas atmosphere in order to increase an oxygen partial pressure at an isothermal sintering temperature in a stepwise manner.

An additive content of the uranium oxide powder may be about 50-2000 μg/g based on a weight ratio ($\Sigma M_i/U$) of additive cations or metal elements with respect to uranium of the uranium oxide powder.

When a sintered nuclear fuel pellet is manufactured with manufacturing conditions according to the present invention, grains are grown while a solubility limit is gradually increased by controlling an oxygen partial pressure during sintering. Therefore, a sufficient grain growth effect may be obtained even when a very small amount of additives is used as above.

The preparing of the additive mixed uranium oxide powder may be performed by a method of mixing or grinding the uranium oxide powder and additive powder.

The forming of the green pellets may be performed by a method of putting the additive mixed uranium oxide powder in a forming mold and molding at a pressure of about 3-5 tons/cm².

Among sesquioxides containing trivalent cations, for example, $Al_2O_3$, $Cr_2O_3$, $Y_2O_3$, and $Al_2O_3$ have a similar tendency to one another, in which solubility in $UO_2$ lattices increases as an oxygen partial pressure increases. Also, grain boundary solubility of the sesquioxides increases as an oxygen partial pressure increases, and the foregoing additive powder may have a relatively low neutron absorption cross-section.

Therefore, the additive powder may be a powder mixed with at least one or more of a chromium (Cr)-compound, an aluminum (Al)-compound, and a yttrium (Y)-compound. The Cr-compound, the Al-compound, and the Y-compound may be at least one or more selected from the group consisting of oxides, nitrates, stearates, chlorides, and hydroxides.

In the preparing of the additive mixed uranium oxide powders, $UO_2$-based powder may be $UO_2$ powder or a powder mixed with the $UO_2$ powder and at least one or more of $PuO_2$ powder, $Gd_2O_3$ powder, and $ThO_2$ powder.

In the sintering, an atmosphere control gas used to increase an oxygen partial pressure may be a hydrogen gas or a mixing gas of a hydrogen gas and at least one or more gases selected from the group consisting of carbon dioxide, water vapor, and inert gases.

MODE FOR INVENTION

Hereinafter, the present invention will be described in more detail by means of Examples. The following Examples only exemplify the present invention, but the scope of the present invention is not limited thereto.

Example 1

About 1500 μg/g of $Cr_2O_3$ powder based on a Cr/U was added to $UO_2$ powder and was wet ground, and then, $Cr_2O_3$ mixed $UO_2$ powder was prepared by drying the ground powder. Cylindrical green pellets were manufactured by press molding the mixed powder at a pressure of about 3 tons/cm².

The green pellets were subjected to sintered pellet manufacturing processes of the following Table 1 and then, grain sizes were measured and presented in Table 1. The densities of sintered pellets were measured by Archimedes method. Thereafter, cross-sections of the pellets were polished to observe a pore structure, and also thermally etched to observe a grain structure. The grain size of the pellets was measured by a linear intersection method.

Figure 2:
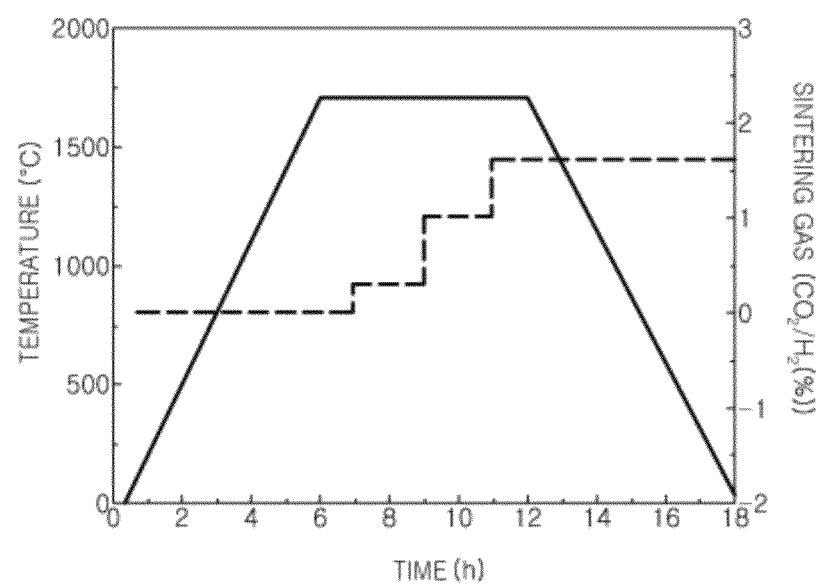
FIG. 2 is a graph schematically illustrating a sintering process of the present invention.

Also, as an example of the present invention, a sintering process of Example 1 was presented in FIG. 2. In the sintering process of the foregoing green pellets, a hydrogen atmosphere having a low oxygen partial pressure at which $Cr_2O_3$ is reduced to Cr is maintained up to a sintering temperature of about 1700° C. The reason for this is to prevent the foregoing C value from being lowered during isothermal sintering by minimizing a dissolving rate of Cr ions in $UO_2$ lattices.

In the foregoing sintering process, a mixing ratio of $CO_2$ in hydrogen is stepwise increased in order to stepwise increase an oxygen partial pressure of a sintering gas in an isothermal sintering range of about 1700° C. The foregoing B and C values are always maintained above a certain level of values when the mixing ratio is increased as above, thereby enabling an effect of maximizing grain growth to be obtained.

Figure 3A:
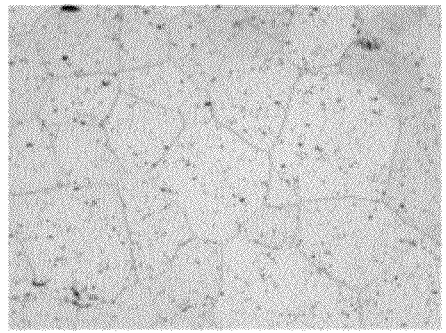
Figure 3B:
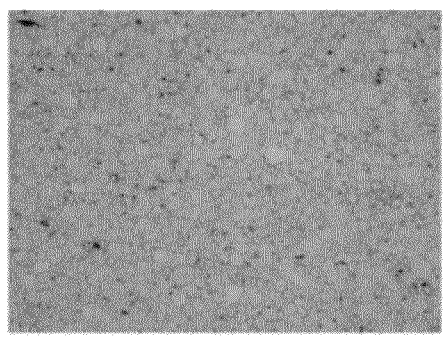
Figure 3B:
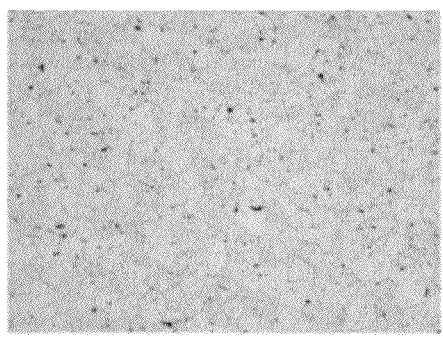
Figure 3B:
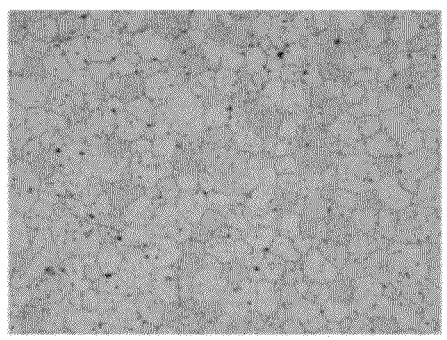
Figure 3B:
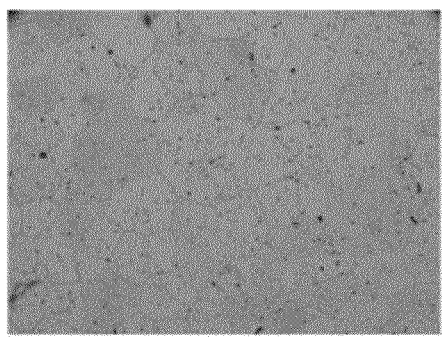

Also, micrographs of grains in the respective Example and Comparative Examples were observed, and the results thereof were presented in FIGS. 3A and 3B. FIG. 3A is a micrograph of grains of Example 1, and (B-1), (B-2), (B-3), and (B-4) of FIG. 3B are micrographs of grains in Comparative Examples 1, 2, 3, and 4, respectively.

TABLE 1

| | Sintered pellet manufacturing process | | | | | Grain Size |
|---|---|---|---|---|---|---|
| Example 1 | Maintain for 1 hour after heating to 1700° C. at a rate of 300° C./h in an atmosphere of 0.05 volume % or less of $CO_2/H_2$ gas ratio | Maintain for 2 hours at 0.3 volume % of $CO_2/H_2$ gas ratio | Maintain for 2 hours at 1 volume % of $CO_2/H_2$ gas ratio | Maintain for 2 hours at 1.6 volume % of $CO_2/H_2$ gas ratio | Cool to room temperature (300° C./h) | 130 μm |
| Comparative Example 1 | Maintain for 6 hours after heating to 1700° C. at a rate of 300° C./h at 0.3 volume % or less of moisture/$H_2$ gas ratio | | | | | 17 μm |
| Comparative Example 2 | Maintain for 4 hours after heating to 1700° C. at a rate of 300° C./h at 1.0 volume % or less of moisture/$H_2$ gas ratio | | | | | 34 μm |
| Comparative Example 3 | Maintain for 4 hours after heating to 1700° C. at a rate of 300° C./h at 1.6 volume % or less of moisture/$H_2$ gas ratio | | | | | 45 μm |
| Comparative Example 4 | Heating up to 1700° C. at a rate of 300° C./h at 0.05 volume % or less of $CO_2/H_2$ gas ratio | Maintain for 6 hours at 1.6 volume % of $CO_2/H_2$ gas ratio | | | | 62 μm |

When grain sizes in Example 1 and Comparative Examples 1 to 4 in Table 1 are compared, it may be confirmed that the grain size of Example 1 is 130 μm, which is increased about 2-9 times in comparison to the grain sizes of Comparative Examples 1 to 4. Differences between Example 1 and Comparative Examples 1 to 4 may be easily confirmed through the micrographs of grain sizes in FIGS. 3A and 3B.

Referring to (B-1) of FIG. 3B and Table 1, the grain size of Comparative Example 1 is 17 μm, which represents a smaller grain size of about 1/19 times or less than that of Example 1. It may be understood that Comparative Example 1 has the smallest grain size among the Comparative Examples.

Referring to (B-2) of FIG. 3B and Table 1, the grain size of Comparative Example 2 is 34 μm, which represents a smaller grain size of about 1/5 times or less than that of Example 1. On the other hand, it may be confirmed that the grain size of Comparative Example 2 increased about 2 times in comparison to that of Example 1. Since a sintered pellet was manufactured under a moisture/hydrogen gas ratio condition of 1.0 volume % in Comparative Example 2 while the moisture/hydrogen gas ratio in Example 1 was 0.3 volume %, the solubility of Cr becomes high as an oxygen partial pressure increases. As a result, it is considered that a grain size increases due to a fast material transfer rate.

Referring to (B-3) of FIG. 3B and Table 1, the grain size of Comparative Example 3 is 45 μm, which represents a smaller grain size of about 1/3 times or less than that of Example 1. On the other hand, the grain size of Comparative Example 3 increased by about 3 times in comparison to that of Example 1. The reason is that a Cr additive forms a liquid phase in a sintering gas atmosphere to increase a material transfer rate.

Referring to (B-4) of FIG. 3B and Table 1, the grain size of Comparative Example 4 is 62 μm, which represents a smaller grain size of about 1/2 times or less than that of Example 1. On the other hand, the grain size of Comparative Example 4 increased about 3.5 times or more in comparison to that of Example 1. Even though Comparative Example 4 was performed for the purpose of increasing an amount of a liquid phase by maximally preventing Cr from dissolving in $UO_2$ during heating to a sintering temperature, the liquid phase is dissolved fast into grain boundaries during sintering. As a result, the grain size of Comparative Example 4 is small in comparison to Example 1. Therefore, it may be understood that properly controlling a concentration of Cr dissolved at grain boundaries and a concentration of Cr dissolved in grains during sintering, as in Example 1, is very effective in increasing a grain size.

Example 2

About 500 μg/g of $Cr_2O_3$ powder based on a Cr/U was added to $UO_2$ powder and was wet ground, and then, $Cr_2O_3$ mixed $UO_2$ powder was prepared by drying the ground powder. Processes of manufacturing green pellets and sintered pellets by using the ground powder were performed using the same method as that of Example 1.

Figure 3C:
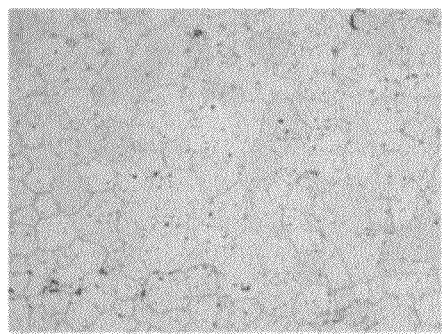

Densities and grain sizes were measured, and micrographs of grains were observed and the result thereof was presented in FIG. 3C.

The grain size of Example 2 was measured as 46 μm, which is similar to Comparative Example 3 having a grain size of 45 μm. When Example 2 and Comparative Example 3 are compared, about 500 μg/g of $Cr_2O_3$ powder was added in Example 2 while about 1500 μg/g of $Cr_2O_3$ powder was added in the case of Comparative Example 3. Therefore, it is confirmed that a similar grain size may be obtained by adding a small additive amount, i.e., about 1/3 of a typical additive amount, when a sintered pellet is manufactured by a manufacturing method according to the present invention.

While the present invention has been shown and described in connection with the exemplary embodiments, it will be apparent to those skilled in the art that modifications and variations can be made without departing from the spirit and scope of the invention as defined by the appended claims.

The invention claimed is:

1. A method of manufacturing a sintered nuclear fuel pellet having a large grain size, the method comprising:
    mixing an additive powder and a uranium oxide powder to prepare an additive mixed uranium oxide powder;
    forming an additive mixed uranium oxide green pellet by using the mixed powder;
    heating the green pellet to an isothermal sintering temperature in an atmosphere control gas having an oxygen partial pressure corresponding to a minimum oxygen partial pressure of isothermal sintering or less; and
    changing a sintering gas atmosphere to perform the isothermal sintering such that an oxygen partial pressure is stepwise increased three times at the isothermal sintering temperature.

2. The method of claim 1, wherein an amount of additive cations with respect to about 1 g of uranium-based cations in the uranium oxide green pellet is about 10-2000 μg.

3. The method of claim 1, wherein the additive powder is a powder mixed with at least one or more of a chromium (Cr)-compound, an aluminum (Al)-compound, and a yttrium (Y)-compound.

4. The method of claim 3, wherein the Cr-compound, the Al-compound, and the Y-compound are at least one or more selected from the group consisting of oxides, nitrates, stearates, chlorides, and hydroxides.

5. The method of claim 1, wherein in the preparing of the additive mixed uranium oxide powder, a $UO_2$-based powder is a $UO_2$ powder or a powder mixed with the $UO_2$ powder and one or more of a $PuO_2$ powder, a $Gd_2O_3$ powder, and a $ThO_2$ powder.

6. The method of claim 1, wherein the atmosphere control gas is a hydrogen gas or a mixing gas of a hydrogen gas and at least one or more gases selected from the group consisting of carbon dioxide, water vapor, and inert gases.

7. The method of claim 1, wherein the forming of the green pellets is performed by a step of putting the additive mixed uranium oxide powder in a forming mold and molding at a pressure of about 3-5 tons/cm².

8. The method of claim 1, wherein the additive mixed uranium oxide powder comprises at least one or more of $PuO_2$ powder, $Gd_2O_3$ powder, and $ThO_2$ powder.

* * * * *